US010264542B2

(12) United States Patent
Bal et al.

(10) Patent No.: US 10,264,542 B2
(45) Date of Patent: Apr. 16, 2019

(54) WIRELESSLY SYNCHRONIZED CLOCK NETWORKS

(71) Applicant: Integrated Device Technology, Inc., San Jose, CA (US)

(72) Inventors: Jagdeep Bal, Saratoga, CA (US); Elie Ayache, Santa Clara, CA (US); Eduard Van Keulen, Morgan Hill, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/475,648

(22) Filed: Mar. 31, 2017

(65) Prior Publication Data

US 2018/0288718 A1 Oct. 4, 2018

(51) Int. Cl.
*H04L 7/04* (2006.01)
*H04W 56/00* (2009.01)

(52) U.S. Cl.
CPC ........... *H04W 56/0015* (2013.01); *H04L 7/04* (2013.01)

(58) Field of Classification Search
CPC ....................................................... H04L 7/04
See application file for complete search history.

(56) References Cited

U.S. PATENT DOCUMENTS

| 5,721,738 A * | 2/1998 | Kubota | H04J 3/0632 370/508 |
| 7,242,740 B2 | 7/2007 | Spijker et al. | 375/376 |
| 7,486,741 B2 * | 2/2009 | Sohng | H04B 10/1141 375/286 |
| 2010/0315142 A1 * | 12/2010 | Zerbe | H04L 7/0337 327/161 |
| 2011/0219208 A1 * | 9/2011 | Asaad | G06F 15/76 712/12 |
| 2011/0235621 A1 * | 9/2011 | Ko | H04W 72/1215 370/338 |
| 2012/0159026 A1 * | 6/2012 | Kataoka | H04N 21/242 710/110 |

* cited by examiner

*Primary Examiner* — Jaison Joseph
(74) *Attorney, Agent, or Firm* — Christopher P. Maiorana, PC

(57) ABSTRACT

An apparatus includes a first independently clocked device and one or more second independently clocked devices. The first independently clocked device may comprise a clock generator. The clock generator may be configured to generate a clock signal. The first independently clocked device may be configured to wirelessly broadcast a synchronization signal based on the clock signal. The one or more second independently clocked devices may each comprise respective clock generators. The one or more second independently clocked devices may (a) be configured to receive the synchronization signal from the first independently clocked device and (b) synchronize the respective clock generators to the clock signal of the first independently clocked device in response to the synchronization signal.

20 Claims, 6 Drawing Sheets

WIRELESSLY SYNCHRONIZED CLOCK NETWORKS

This application relates to co-pending U.S. application Ser. No. 15/475,328, filed Mar. 31, 2017, which is incorporated by reference in its entirety.

FIELD OF THE INVENTION

The invention relates to synchronous systems generally and, more particularly, to a method and/or apparatus for implementing wirelessly synchronized clock networks.

BACKGROUND

One of the challenges of electronic system design is distributing a clock signal throughout the system. System designers generally use two architecture types to distribute the clock signal to various parts of the system. In a first clock distribution architecture, all of the clocks in the system are generated by a central clock source (or generator) and routed by board traces to wherever the clocks are needed. In a central clock source system, synchronizing all the clocks is not difficult since all the clocks are derived from the same source. However, the board designer needs to be careful to shield or isolate the clock lines from sources of noise. In addition, driving the traces takes a non-trivial amount of power from the central clock generator.

In a second commonly used clock distribution architecture, many different clock sources (generators) are scattered throughout the system, each placed near the chips to be driven by the different clock sources. In distributed clock systems, clock routing is straightforward and clock degradation is minimal since the transmission path is very short. However, since all of the distributed clock sources operate completely independently in the conventional distributed clock architecture, synchronization is not possible.

It would be desirable to implement wirelessly synchronized clock networks.

SUMMARY

The invention concerns an apparatus comprising a first independently clocked device and one or more second independently clocked devices. The first independently clocked device may comprise a clock generator. The clock generator may be configured to generate a clock signal. The first independently clocked device may be configured to wirelessly broadcast a synchronization signal based on the clock signal. The one or more second independently clocked devices may each comprise respective clock generators. The one or more second independently clocked devices may (a) be configured to receive the synchronization signal from the first independently clocked device and (b) synchronize the respective clock generators to the clock signal of the first independently clocked device in response to the synchronization signal.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a wirelessly synchronized clock network that may (i) use a wireless communication network as a clock network, (ii) broadcast a synchronization signal to distributed system elements, (iii) synchronize a number of independent local clocks to a received synchronization signal, (iv) modulate a low frequency synchronization signal on a high frequency carrier, (v) be applied to multiple cards on backplanes, (vi) provide connection between clocks on enterprise routers, (vii) be used in automotive applications, (viii) be used to synchronize clocks in different systems that are within a broadcast range, and/or (ix) be implemented as one or more integrated circuits.

Figure 1:
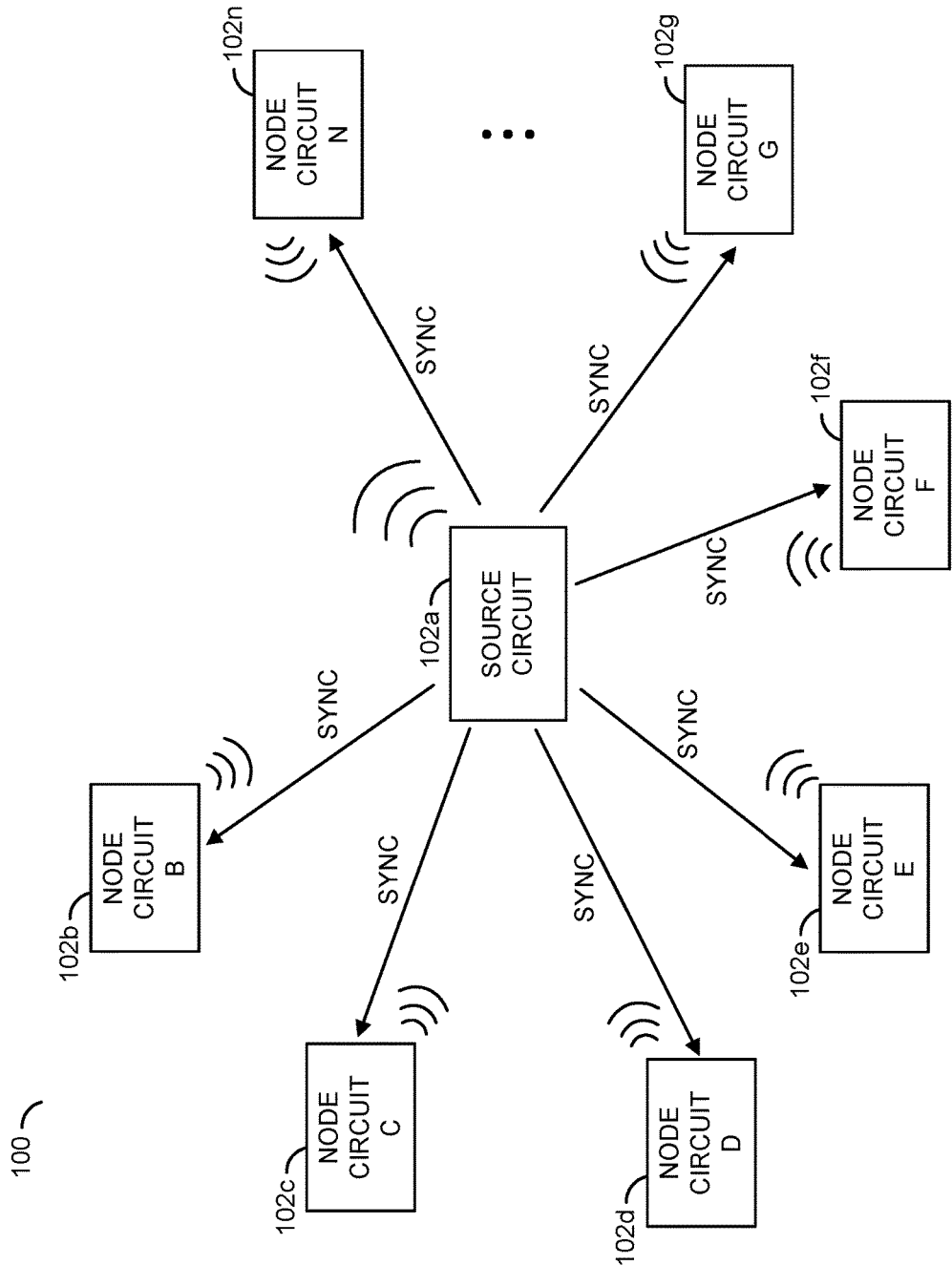
FIG. 1 is a diagram illustrating a wirelessly synchronized distributed clock system in accordance with an example embodiment of the invention.

Referring to FIG. 1, a diagram of a system 100 is shown illustrating a wirelessly synchronized distributed clock system in accordance with an example embodiment of the invention. In various embodiments, the system 100 comprises a plurality of blocks (or chips or devices or modules or boards or systems) 102a-102n. The system 100 may comprise other components (not shown). The components of the system 100 may be varied according to the design criteria of a particular implementation.

The circuits 102a-102n may be configured in a source and node configuration (e.g., a master-slave configuration, a parent-child configuration, etc.). One of the circuits 102a-102n may be configured to implement a source circuit. Each of the circuits 102a-102n that does not implement the source circuit may implement node circuits. In the example shown, the circuit 102a may be configured as a source circuit and the circuits 102b-102n may be configured as node circuits. Generally, any one of the circuits 102a-102n may be configured as the source circuit and the remaining circuits may be configured as the node circuits. The particular one of the circuits 102a-102n that implements the source circuit and the particular circuits 102a-102n that implement the node circuits may be varied according to the design criteria of a particular implementation.

Each of the circuits 102a-102n may be configured to communicate wirelessly. The circuits 102a-102n may be configured to communicate wirelessly with each other. For example, the source circuit 102a may be configured to transmit a wireless signal and the node circuits 102b-102n may be configured to receive a wireless signal. In some embodiments, each of the circuits 102a-102n may be configured to send and/or receive signals wirelessly. In some embodiments, the source circuit (e.g., the circuit 102a) may be configured to send signals wirelessly but not receive signals wirelessly and the node circuits (e.g., the circuits 102b-102n) may be configured to receive signals wirelessly but not send signals wirelessly. In some embodiments, the source circuit (e.g., the circuit 102a) may be configured to send signals wirelessly and receive signals wirelessly and the node circuits (e.g., the circuits 102b-102n) may be configured to receive signals wirelessly but not send signals wirelessly.

The source circuit (e.g., the circuit 102a) may be configured to generate a signal (e.g., SYNC). The signal SYNC may implement a synchronization signal. In an example, the synchronization signal may implement a beacon. The signal SYNC may be configured to synchronize the clock signals used (e.g., used internally) by each of the circuits 102a-102n. Synchronizing the clock signals used by the circuits 102a-102n with the synchronization signal SYNC may control the clock skew between the circuits 102a-102n, while eliminating circuit design issues caused by a clock tree (e.g., reducing noise effects of trace lines, reducing power consumption compared to implementing a central clock generator, enabling drop in solutions by avoiding additional signal routing for the circuits 102a-102n, etc.). Implementing the synchronization signal SYNC may enable distribution of a common clock signal from the same source (e.g., the source circuit 102a) to various parts of the system 100 (e.g., the node circuits 102b-102n). In the example shown, the central circuit 102a may be centrally located, and the synchronization signal SYNC may be broadcast centrally.

Figure 2:
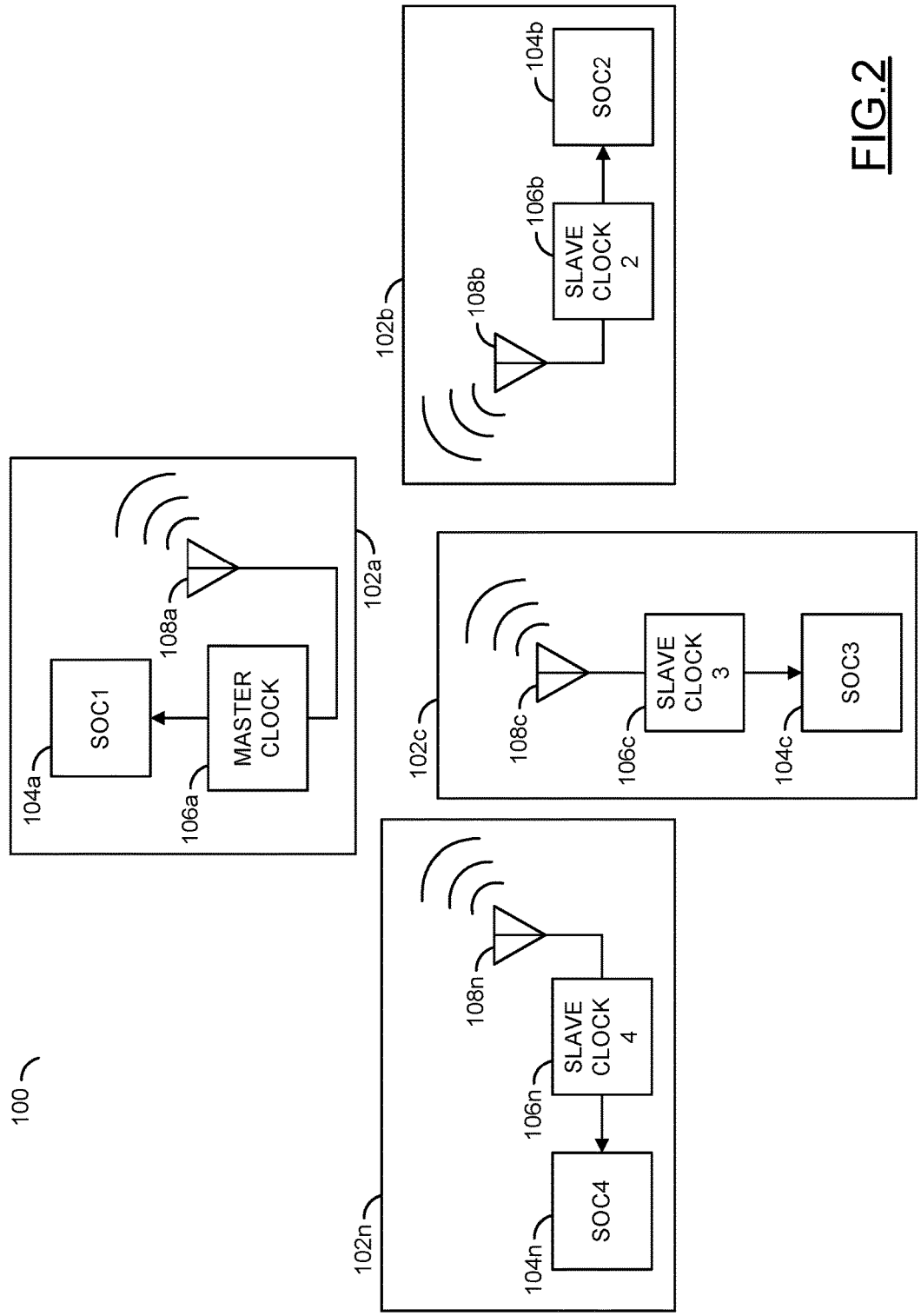
FIG. 2 is a diagram illustrating components of the wirelessly synchronized distributed clock system in accordance with an example embodiment of the invention.

Referring to FIG. 2, a diagram is shown illustrating components of the wirelessly synchronized distributed clock system 100. In various embodiments, the blocks 102a-102n may be used to implement, but are not limited to implementing, (i) a server main board with riser cards, (ii) multiple cards on a backplane, (iii) enterprise routers, (iv) modules distributed around a vehicle, (v) components of a multi-media system, (vi) smart phones, (vii) smart headphones, (viii) virtual reality or immersive reality system components, (ix) multifunction printers, (x) industrial systems, (xi) multi-chip modules, (xii) a motherboard and PCIe daughter cards, and/or (xiii) any system containing a plurality of clocked elements that are within close range but different (separate) locations. The types of circuits implement by the circuits 102a-102n may be varied according to the design criteria of a particular implementation.

The system 100 may implement non-crystal resonators in the nodes 102b-102n (e.g., the slave devices). The system 100 may be configured to provide advantageous features of both centralized and/or distributed clocking solutions. For example, the system 100 may comprise a central clock source (e.g., the source circuit 102a). In another example, the system 100 may avoid issues related to routing traces for a clock tree from the central clock source 102a to the nodes 102b-102n by implementing straightforward clock routing within each of the circuits 102a-102n. In yet another example, the system 100 may ensure a synchronization of the clocks for each of the circuits 102a-102n. In still another example, the system 100 may enable the circuits 102a-102n to be implemented as drop in replacements for devices that implement crystal oscillators. The wirelessly synchronized network implemented by the system 100 may control skew at the various node circuits 102b-102n in the system 100. The wirelessly synchronized network implemented by the system 100 may enable flexibility and/or ease of board design of a distributed clock network.

In one example, the drop in replacement devices 102a-102n may be configured as PCIe cards. For example, PCIe bus slots are typically backward compatible with other PCIe bus slots, allowing PCIe links that use fewer lanes to use the same interface as PCIe links that use more lanes. PCIe may be utilized to provide high-speed networking across server backplanes, and connect to Gigabit Ethernet, RAID and Infiniband networking technologies outside of the server rack. The PCIe bus may also be utilized to interconnect clustered computers using HyperTransport. Mini PCI-e cards may be used to connect wireless adaptors, solid state device storage and other performance boosters to laptops, notebooks, networks, mobile devices, etc. External PCI Express (ePCIe) may be used to connect a motherboard to an external PCIe interface, allowing a higher number of PCIe ports. In an example, a high frequency local clock on each PCIe card (e.g., the node circuits 102b-102n) may be synchronized using the low frequency synchronization signal SYNC generated by a motherboard (e.g., the source circuit 102a) and presented wirelessly. In another example, the source circuit 102a may be implemented as a separate device and configured to wirelessly broadcast the synchronization signal SYNC to a number of independently clocked devices including, but not limited to, host cards, line cards, server blades and/or fabric cards.

Each of the blocks 102a-102n may comprise a respective one of a first block (e.g., 104a-104n), a respective one of a second block (e.g., 106a-106n) and a respective one of a circuit (e.g., 108a-108n). The first blocks 104a-104n may implement a functionality of the circuits 102a-102n. The second blocks 106a-106n generally implement a local clock generator (e.g., independent clocking) of the circuits 102a-102n. The circuits 108a-108n may implement a transmitter and/or receiver for the circuits 102a-102n. Each of the blocks 102a-102n may comprise other circuits and/or blocks (not shown). The number and/or type of components and/or functionality implemented by the circuits 102a-102n may be varied according to the design criteria of a particular implementation.

In an example, each of the blocks 104a-104n may be implemented as a system on chip (SoC). In another example, each of the blocks 104a-104n may be implemented as a multi-chip module (MCM). In yet another example, each of the blocks 104a-104n may be implemented as a number of widely spaced independently clocked modules or devices. In still another example, each of the blocks 106a-106n may be implemented as an independent crystal oscillator. The blocks 106a-106n are generally configured to provide independent clocks to respective ones of the blocks 104a-104n (e.g., the respective independent clock signal may be distributed to the various components implemented by the circuits 104a-104n). In the example shown, the local clock generator 106a of the source circuit 102a may implement a master clock and the local clock generators 106b-106n of the node circuits 102b-102n may implement slave clocks. The master clock 106a may be used by the system 100 as a source for synchronizing the slave clocks 106b-106n. The slave clocks provided by the blocks 106b-106n of the node circuits 102b-102n are generally synchronized (e.g., frequency and/or phase) with the master clock provided by the master clock circuit 106a using the synchronization signal SYNC provided (broadcasted) by the source circuit 102a.

The synchronization signal SYNC may be configured to match a timing generated by the master clock 106a to each of the slave clocks 106b-106n. In various embodiments, the synchronization signal SYNC may be implemented with pulses, a 50% duty cycle, a duty cycle less than 50%, etc. In some embodiments, the synchronization signal SYNC may be implemented as a bit sequence or sequences to allow independent synchronization of multiple systems and/or devices. Generally, the average frequency of the synchronization signal SYNC may enable synchronization. The implementation of the synchronization signal SYNC may be varied according to the design criteria of a particular implementation.

In some embodiments, the blocks 102a-102n may be implemented as drop in replacements for devices in types of distributed clocking systems implementing an architecture type in which each circuit is linked by a master clock signal that is physically routed (e.g., using traces and/or wires) from a clock source to a number of slave clock sources in a clock network and/or clock tree. Instead of using traces or wires, the wirelessly synchronized distributed clock system 100 may implement the blocks 102a-102n to allow the synchronization (or reference) signal SYNC to be distributed wirelessly to all of the distributed clocks 106b-106n in the clock network.

In various embodiments, rather than distributing and/or skew controlling a high frequency clock throughout the system 100 using a clock tree, the low speed (frequency) synchronization signal (clock) SYNC may be distributed wirelessly and the high frequency clocks may be localized at the circuits 102a-102n. In various embodiments, the slave (receiving) clock generators 106b-106n are generally configured to phase lock the locally generated reference clock to the incoming synchronization signal SYNC from the master clock 106a. Jitter content in the synchronization signal SYNC generally does not significantly affect operation of the system 100. In general, local jitter is determined by the clock generators 106a-106n.

Figure 3:
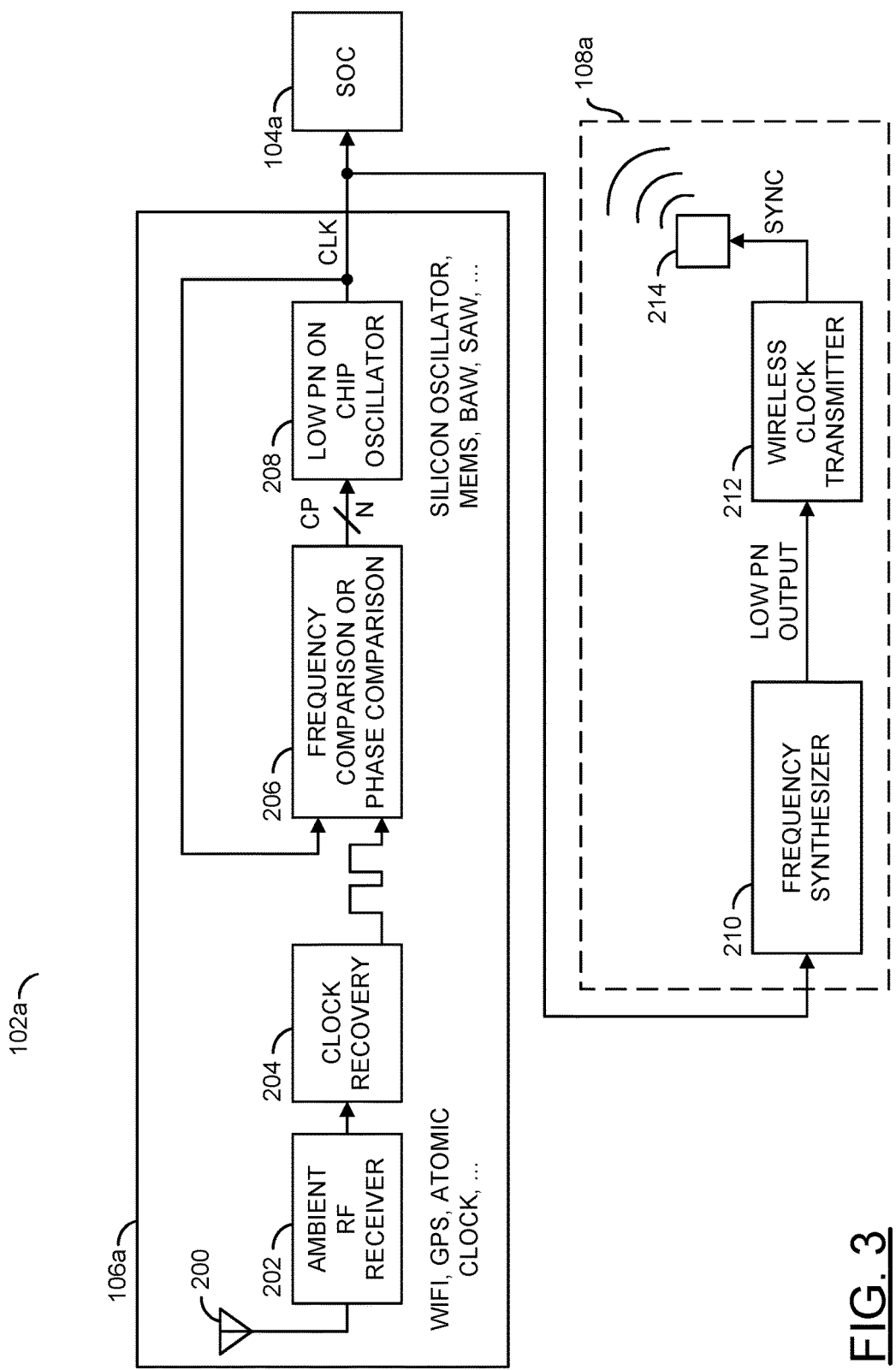
FIG. 3 is a diagram illustrating an example implementation of a master clock module in accordance with an example embodiment of the invention.

Referring to FIG. 3, a diagram of the source circuit 102a is shown illustrating an example implementation of a master clock module in accordance with an example embodiment of the invention. In various embodiments, the system 100 may be wirelessly synchronized based upon a synchronization signal SYNC generated by the circuit (or module) 102a. In various embodiments, the circuit 102a generally eliminates a need for additional signal routing (e.g., a clock tree) from the master clock module 102a to the node (or slave) circuits 102b-102n. In various embodiments, the circuit 102a may be utilized as part of a wirelessly synchronized network of clocks that are drop in replacements for crystal oscillators. In the example shown, the source circuit may be the circuit 102a (as shown in FIG. 1), but any one of the circuits 102a-102n may be configured as the source circuit.

In various embodiments, the source circuit 102a may comprise the circuit 104a, the master clock 106a and/or the transmitter/receiver 108a. Each of the circuits 104a-108a may comprise sub-components. The circuit 104a may comprise components for implementing the functionality of the circuit 102a. The components of the circuit 104a may operate based on local clocking. The master clock 106a may comprise a block (or circuit) 200, a block (or circuit) 202, a block (or circuit) 204, a block (or circuit) 206 and/or a block (or circuit) 208. The transmitter/receiver 108a may comprise a block (or circuit) 210, a block (or circuit) 212 and/or a block (or circuit) 214. The circuits 106a and/or 108a may comprise other components (not shown). The implementation of the circuits 104a-108a may be varied according to the design criteria of a particular implementation.

The circuit 200 may be implemented as an antenna. The circuit 202 may be implemented as an ambient radio frequency (RF) receiver. The circuit 204 may be implemented as a clock recovery module. The circuit 206 may be implemented as a frequency and/or phase comparison module. The circuit 208 may be implemented as a low phase noise (PN) on-chip oscillator circuit. The circuit 210 may be implemented as a frequency synthesizer circuit (or module). The circuit 210 may be configured to generate a low phase noise output signal. The circuit 212 may be implemented as a wireless clock transmitter (e.g., a RF transmitter). The circuit 214 may be implemented as an antenna. In some embodiments, the circuit 214 may be a broadcasting device (e.g., a LED, a sound transducer, etc.)

In various embodiments, the circuit 202 may be configured to receive an ambient RF clock signal via the antenna 200. In some example embodiments, the ambient RF clock signal may include, but is not limited to, a network time signal (e.g., IEEE 802.11a/b/g/n Wi-Fi time server signal), a global positioning system (GPS) clock signal, an atomic clock based signal, etc. An output of the circuit 202 may be presented to an input of the circuit 204.

The clock recovery circuit 204 may be configured to generate a clock signal based on the input received from the ambient RF receiver 202. In one example, the clock recovery circuit 204 may implement a phase-locked loop (PLL). In another example, the clock recovery circuit may implement a delay-locked loop (DLL). The circuit 204 is generally configured to present a recovered clock signal to a first input of the circuit 206.

The circuit 206 is generally configured to compare the recovered clock signal received at the first input (e.g., from the clock recovery circuit 204) with a clock signal received at a second input (e.g., a feedback signal). In various embodiments, the circuit 206 may be configured to perform frequency comparison, phase comparison and/or phase and frequency comparison. An output of the circuit 206 may present a signal (e.g., CP). The signal CP may indicate a result of the particular comparison performed by the circuit 206. In some embodiments, the signal CP presented by the circuit 206 may be a multi-bit digital signal (e.g., comprising n bits).

In various embodiments, the output signal CP of the circuit 206 may be presented to a control input of the circuit 208. The circuit 208 may be configured to generate a signal (e.g., CLK). The signal CLK may be fed back from the circuit 208 to the second input of the circuit 206. For example, the recovered clock signal from the circuit 204 and the signal CLK from the circuit 208 may be compared by the circuit 206. The signal CP may be generated by the circuit 206 in response to the comparison of the recovered clock signal and the signal CLK.

The signal CLK may implement a clock signal. The circuit 208 may be configured to generate the clock signal CLK. The clock signal CLK may have a particular frequency and/or phase based upon the signal CP received at the control input of the circuit 208. In various embodiments, the circuit 208 may implement one or more of a silicon oscillator, MEMS, BAW (bulk acoustic wave filter), SAW (surface acoustic wave) filter, etc. The output signal CLK of the circuit 208 may be used to clock associated circuitry. The signal CLK may implement a local clock signal (e.g., local to the circuit 102a). In one example, the signal CLK may be presented to clock the circuit 104a (e.g., to clock the components of the circuit 104a).

The output signal CLK from the circuit 208 may be presented to an input of the circuit 108a. The frequency synthesizer circuit 210 may receive the signal CLK. The circuit 210 may be configured to generate a low phase noise (PN) synchronization signal SYNC based upon the signal CLK received at the input. In one example, the synchronization signal SYNC may be a low frequency signal (e.g., KHz). In another example, the synchronization signal SYNC may be a high frequency signal (e.g., MHZ or GHz). In various embodiments, the output of the circuit 210 may be presented to an input of the circuit 212.

In various embodiments, the circuit 212 is configured to broadcast the synchronization signal SYNC to the receiver nodes (e.g., the blocks 106b-106n) via the antenna 214. In some embodiments (e.g., when the synchronization signal SYNC is implemented having a low frequency), the circuit 212 may be configured to modulate (e.g., amplitude, frequency, pulse width, etc.) a carrier signal for broadcasting the low frequency synchronization signal SYNC. In an example, the synchronization signal SYNC may be implemented to oscillate at a low frequency (e.g., in the kHz range). The signal SYNC may be broadcast along with (e.g., as a component of) the high frequency (e.g., in the GHz range) carrier signal SYNC'. Details of the carrier signal SYNC' may be described in more detail in association with FIG. 6 and/or FIG. 7. The signal SYNC and/or the signal SYNC' may be transmitted by the transmitter/receiver 108a to each of the transmitter/receivers 108b-108n corresponding to the node circuits 102b-102n. The method of transmitting the synchronization signal SYNC may be varied according to the design criteria of a particular implementation.

Figure 4:
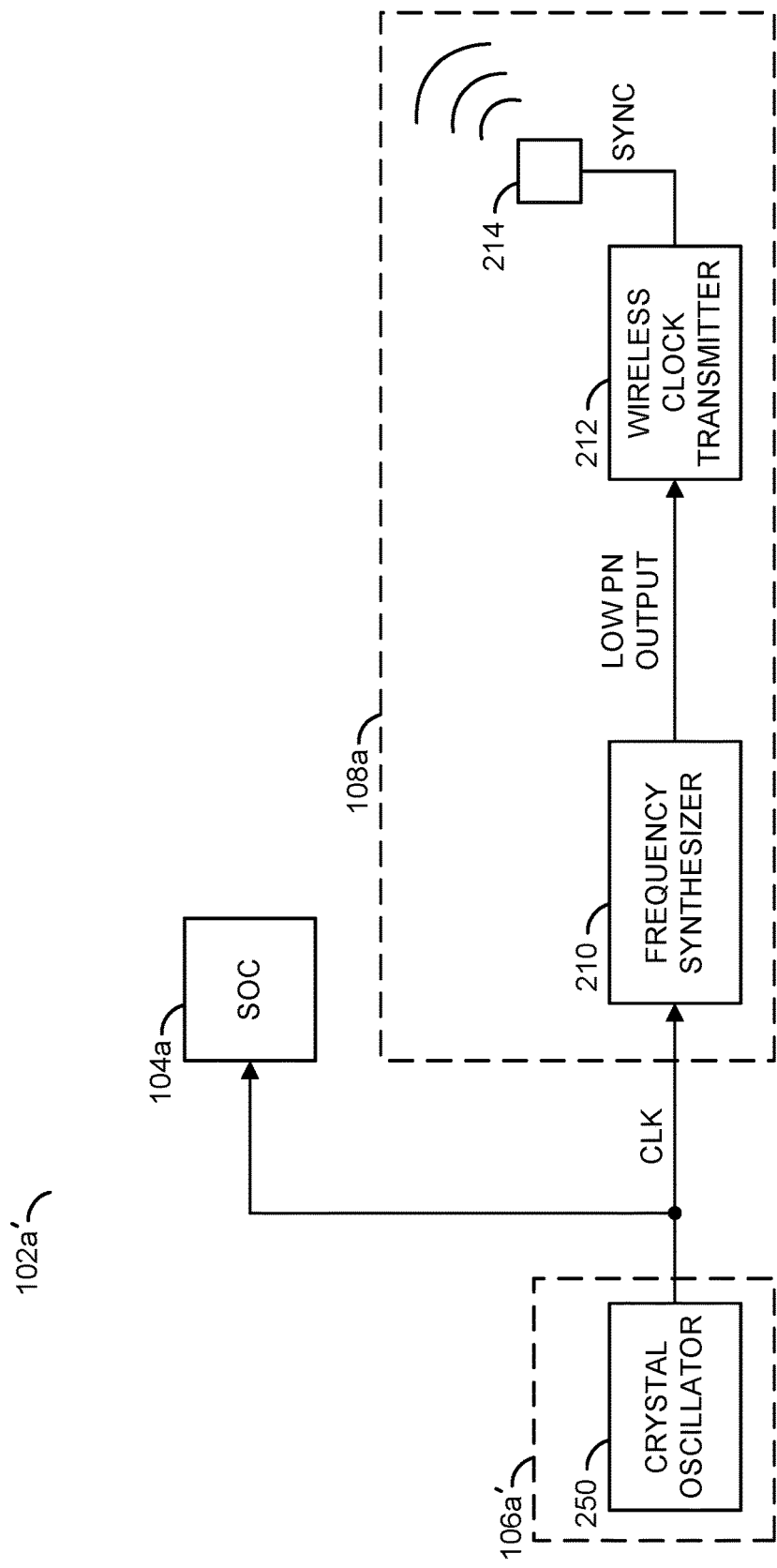
FIG. 4 is a diagram illustrating another example implementation of a master clock module.

Referring to FIG. 4, a diagram of an alternate embodiment of the source circuit 102a' is shown illustrating an example implementation of a master clock module in accordance with an example embodiment of the invention. The source circuit 102a' may comprise the circuit 104a, the circuit 106a' and/or the circuit 108a. The circuit 104a and/or the circuit 108a may have a similar implementation as described in association with FIG. 3. The source circuit 102a' may generate the synchronization signal SYNC.

The master clock circuit 106a' may comprise a block (or circuit) 250. In an example, the circuit 250 may implement a crystal oscillator. Generally, the circuit 250 may be configured to independently generate a clock signal. The circuit 250 may be configured to present the signal CLK. The signal CLK may be presented to the circuit 104a and/or the circuit 108a. Straightforward routing may be used to present the signal CLK to the circuit 104a for local clocking. The implementation of the circuit 250 may be varied according to the design criteria of a particular implementation.

In some embodiments, the synchronization signal SYNC may oscillate at a low frequency. In one example, the synchronization signal SYNC may be a 32 kHz signal. The transmitter/receiver 108a of the source circuit 102a may be configured to communicate the synchronization signal SYNC. The source circuit 102a may be configured to communicate the synchronization signal SYNC using a light strobe, an audio signal, a radio frequency signal, etc. In one example, the system 100 may communicate the synchronization signal SYNC using an LED for optical transmission and photo-receptors for receivers. In another example, the system 100 may implement sonic and/or ultra-sonic transducers. In some embodiments, the synchronization signal SYNC may be broadcast centrally. The type of the synchronization signal SYNC and/or the type of communication used to transmit the synchronization signal SYNC may be varied according to the design criteria of a particular implementation.

Figure 5:
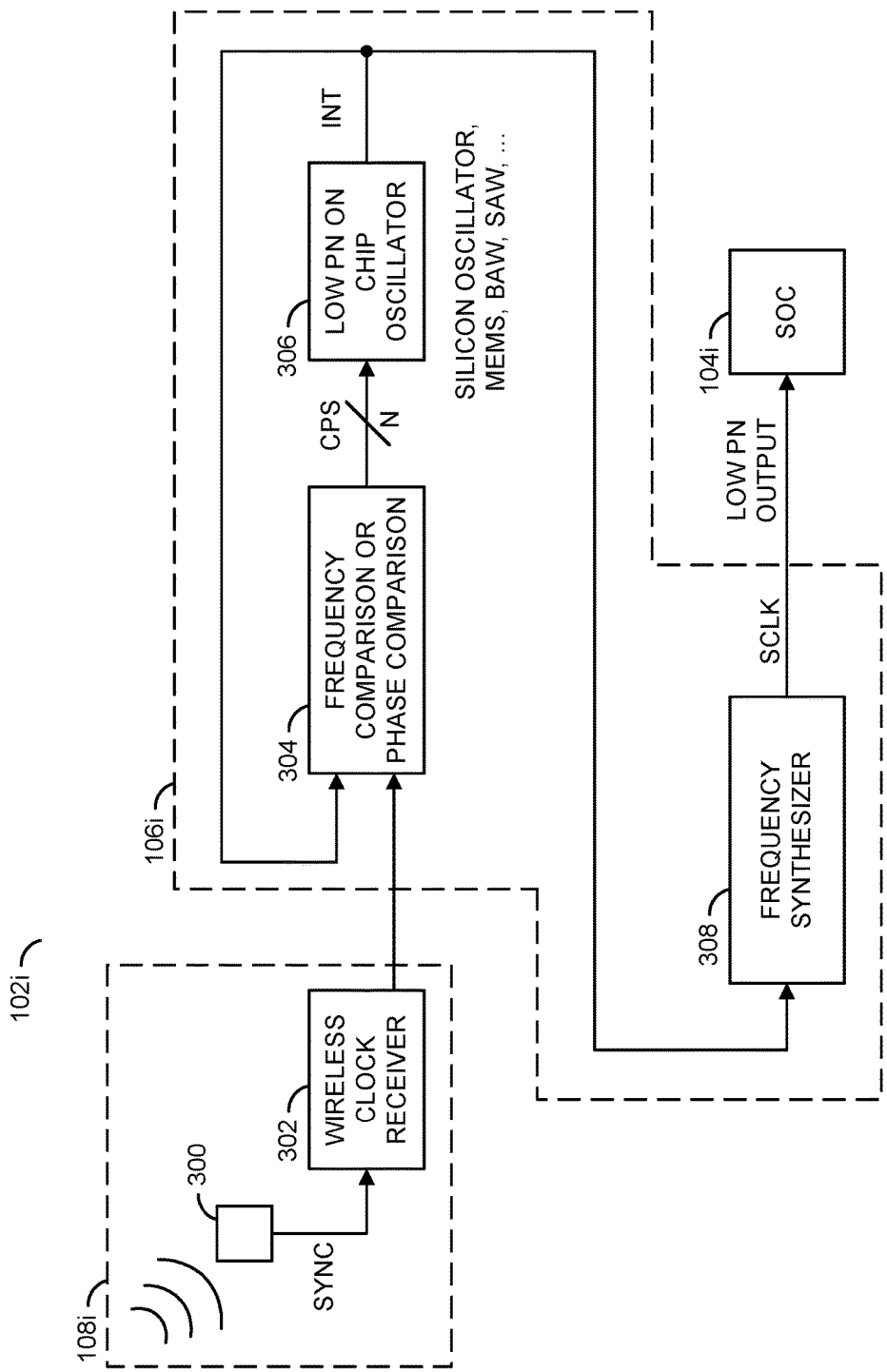
FIG. 5 is a diagram illustrating an example implementation of a slave clock module.

Referring to FIG. 5, a diagram of a circuit 102i is shown illustrating an example implementation of a slave clock module in accordance with an example embodiment of the invention. The node circuit 102i may be a representative example of the node circuits 102b-102n. In various embodiments, the non-master clock modules (e.g., the node circuits 102b-102n) of the system 100 may be wirelessly synchronized based upon the synchronization signal SYNC received by the circuit (or module) 102i. In various embodiments, the circuit 102i generally eliminates a need for additional signal routing (e.g., a clock tree) from the master clock module 102a to each of the non-master devices 102b-102n. In various embodiments, the circuit 102i may be implemented as part of a wirelessly synchronized network of clocks that are drop in replacements for crystal oscillators. In the example shown, the non-master clock module may be the circuit 102i, but any of the circuits 102a-102n may be configured as one of the node circuits.

In various embodiments, the node circuit 102i may comprise the circuit 104i, the slave clock 106i and/or the transmitter/receiver 108i. Each of the circuits 104i-108i may comprise sub-components. The transmitter/receiver 108i may comprise a block (or circuit) 300 and/or a block (or circuit) 302. The slave clock 106i may comprise a block (or circuit) 304, a block (or circuit) 306 and/or a block (or circuit) 308. The circuits 106i and/or 108i may comprise other components (not shown). The implementation of the circuits 104i-108i may be varied according to the design criteria of a particular implementation.

The circuit 300 may be implemented as an antenna. The circuit 302 may be implemented as a wireless (e.g., radio frequency) receiver. The circuit 304 may be implemented as a frequency and/or phase comparison module. The circuit 306 may be implemented as a low phase noise (PN) on-chip oscillator circuit. The circuit 308 may be implemented as a frequency synthesizer circuit (or module). The circuit 308 maybe configured to generate a low PN output signal.

The antenna 300 may be configured to receive a wireless signal. In various embodiments, the circuit 302 may be configured to receive the synchronization signal SYNC (or the carrier signal SYNC') broadcast by the master clock module (e.g., block 106a) via the antenna 300. For example, the circuit 302 may implement a wireless clock receiver. In embodiments where the synchronization signal SYNC is modulated on the carrier signal SYNC', the circuit 302 is generally configured to demodulate and/or recover the synchronization signal SYNC. An output of the circuit 302 may be presented to the slave clock 106i.

A first input of the circuit 304 may receive the signal SYNC from the transmitter/receiver 108i. The circuit 304 is generally configured to compare the recovered synchronization signal SYNC received at the first input (e.g., from the wireless clock receiver 302) with a clock signal received at a second input (e.g., a feedback signal). In various embodiments, the circuit 304 may be configured to perform frequency comparison, phase comparison, or phase and frequency comparison. An output of the circuit 304 may present a signal (e.g., CPS). The signal CPS may indicate a result of the particular comparison performed by the circuit 304. In an example, the result of the comparison may be based on an average frequency of the signal SYNC. In some embodiments, the signal CPS presented by the circuit 304 may be a multi-bit digital signal (e.g., comprising n bits).

The circuit 304 and/or the circuit 306 may be configured to implement a digital phase-locked loop circuit (DPLL). In one example, the circuit 304 and/or the circuit 306 may implement a fractional N phase-locked loop. The digital phase-locked loop circuit may be configured to have a low bandwidth filter in order to reject high frequency noise on the received clock signal (e.g., the synchronization signal SYNC). The digital phase-locked loop circuit implemented by the circuit 304 and/or the circuit 306 may be configured to follow the average frequency (e.g., a DC component) of the synchronization signal SYNC. The digital phase-locked loop circuit may be configured to accommodate a wide range of input frequencies for the average frequency of the signal SYNC. In one example, the average frequency may be a value of 32 kHz. The value selected for the average frequency of the synchronization signal SYNC may be varied according to the design criteria of a particular implementation.

In various embodiments, the output signal CPS of the circuit 304 may be presented to a control input of the circuit 306. The circuit 306 may be configured to generate a signal (e.g., INT). The output signal INT of the circuit 306 may be fed back to the second input of the circuit 304. For example, the synchronization signal SYNC from the circuit 302 and the signal INT from the circuit 306 may be compared by the circuit 304. The signal INT may be generated by the circuit 306 in response to the comparison of the synchronization signal SYNC and the signal INT.

The signal INT may be a clock signal having a particular frequency and/or phase based upon the signal CPS received at the control input of the circuit 306. In various embodiments, the circuit 306 may implement one or more of a silicon oscillator, MEMS, BAW (bulk acoustic wave filter), SAW (surface acoustic wave) filter, etc. The output of the circuit 306 may be presented to an input of the circuit 308.

The frequency synthesizer 308 may receive the signal INT. The circuit 308 may be configured to generate a low phase noise output signal (e.g., SCLK). The signal SCLK may be based upon the signal INT received at the input of the circuit 308. In various embodiments, the output signal SCLK may be a high frequency clock signal (e.g., MHZ, GHz, etc.). The output signal SCLK of the circuit 308 may be used to clock associated circuitry. For example the signal SCLK may implement a local clock signal (e.g., local clocking for the circuit 102$i$). In the example shown, the signal SCLK may be used as a clock signal for the circuit 104$i$. For example, straightforward routing for the signal SCLK may be implemented for local clocking. The local clock signal SCLK for the circuit 102$i$ may be synchronized to the master clock signal CLK of the circuit 102$a$ in response to the synchronization signal SYNC. The synchronization of the local clock signal SCLK for the circuit 102$i$ to the master clock signal CLK of the circuit 102$a$ may be performed by the digital phase-locked loop circuit implemented by the circuit 304 and/or the circuit 306.

The signal SCLK generated by the slave clock 106$i$ may have a timing that is synchronized with the signal CLK generated by the master clock 106$a$ generated locally by the source circuit 102$a$. The signal SCLK generated by the slave clock 106$i$ may be synchronized with the signal CLK generated by the master clock 106$a$ based on the synchronization signal SYNC. Each of the node circuits 102$b$-102$n$ may locally generate a clock signal SCLK that is synchronized with the clock signal CLK generated by the master clock 106$a$. The slave clocks 106$b$-106$n$ may be configured to self-adjust in response to the average frequency of the synchronization signal SYNC. In one example, the slave clock 106$i$ may increase a frequency of the local clock signal SCLK in response to the average frequency of the synchronization signal SYNC in order to synchronize the local clock to the master clock. In another example, the slave clock 106$i$ may decrease a frequency of the local clock signal SCLK in response to the average frequency of the synchronization signal SYNC in order to synchronize the local clock to the master clock.

Some amount of latency may occur between a broadcast of the synchronization signal SYNC and recovery of the local clock signal SCLK. In the example shown in FIG. 1, the source circuit 102$a$ may be centrally located and the synchronization signal SYNC may be broadcast centrally. Centrally broadcasting the synchronization signal SYNC may reduce latency. Other arrangements between the source circuit 102$a$ and/or the node circuits 102$b$-102$n$ may be implemented. Generally, the latency between broadcasting the synchronization signal SYNC and/or recovery of the local clock signal SCLK may be low and/or negligible (e.g., a number of picoseconds). For many embodiments of the system 100, a latency of a number of picoseconds may not matter to the operation of the system 100. Generally, a distance between the source circuit 102$a$ and the node circuits 102$b$-102$n$ may not matter to the operation of the system 100. In embodiments of the system 100 where a latency of a few picoseconds does affect performance of the system 100, the node circuits 102$b$-102$n$ may implement a calibration to remove the latency.

Figure 6:
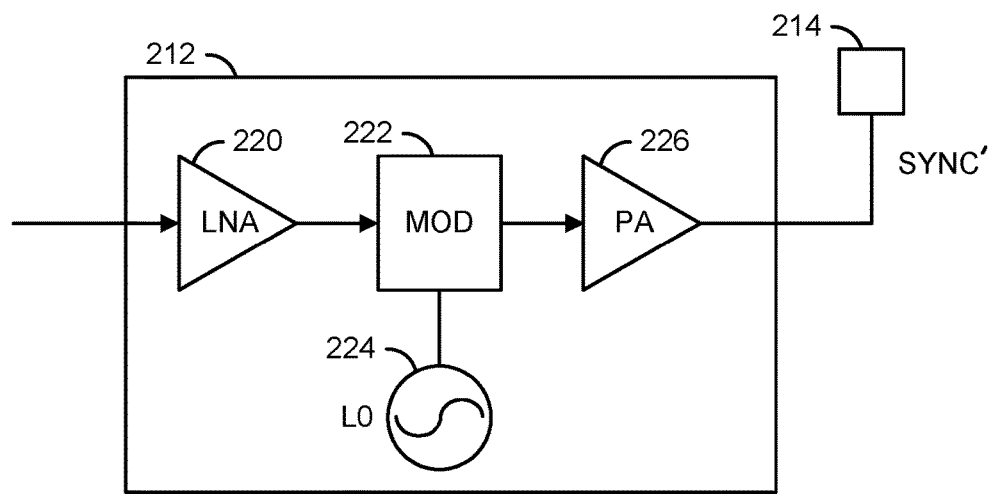
FIG. 6 is a diagram illustrating a synchronization signal transmitter of FIGS. 3 and 4.

Referring to FIG. 6, a diagram is shown illustrating an example implementation of the wireless transmitter 212 of FIG. 3 and FIG. 4. In an example embodiment, the circuit 212 comprises a block (or circuit) 220, a block (or circuit) 222, a block (or circuit) 224 and/or a block (or circuit) 226. The circuit 220 may be implemented as a low noise amplifier (LNA). The circuit 222 may be implemented as a modulator circuit. The circuit 224 may be implemented as a local oscillator circuit (or reference clock). The circuit 226 may be implemented as a power amplifier circuit. The circuit 212 may comprise other components (not shown). The implementation of the circuit 212 may be varied according to the design criteria of a particular implementation.

In various embodiments, the modulator 222 may be configured to generate the carrier signal SYNC' for the synchronization signal SYNC. In an example, the synchronization signal SYNC may be implemented to oscillate at a low frequency. The low noise amplifier 220 may be configured to amplify the frequencies associated with the signal SYNC. The modulator circuit 222 may enable the signal SYNC to be broadcast using a high frequency carrier (e.g., SYNC') to the node circuits 102$b$-102$n$. In various embodiments, the circuit 226 may be configured to drive the antenna 214 in order to broadcast the synchronization signal SYNC using the carrier signal SYNC' throughout the system 100.

Figure 7:
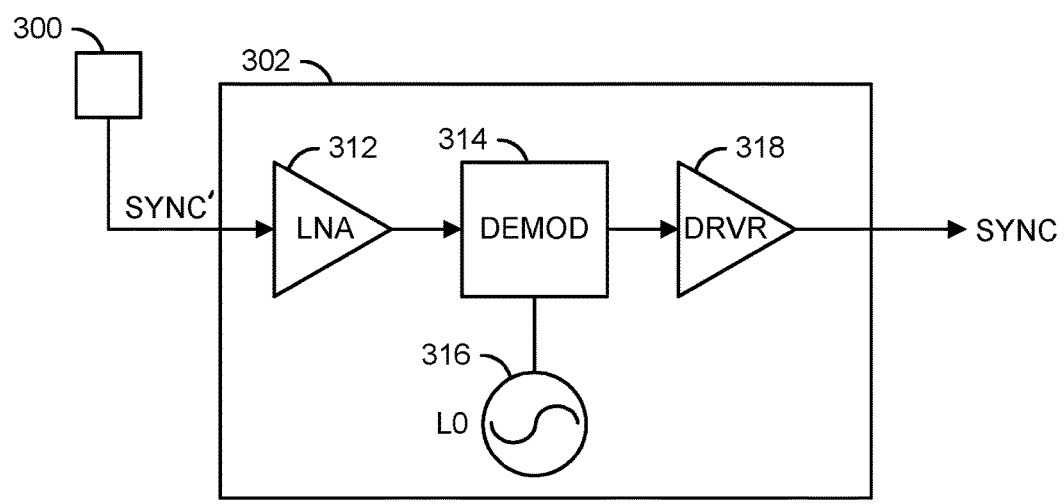
FIG. 7 is a diagram illustrating a synchronization signal receiver of FIG. 5.

Referring to FIG. 7, a diagram is shown illustrating an example implementation of the circuit 302 of FIG. 5. In an example embodiment, the circuit 302 comprises a block (or circuit) 312, a block (or circuit) 314, a block (or circuit) 316 and/or a block (or circuit) 318. The circuit 312 may be implemented as a low noise amplifier (LNA). The circuit 314 may be implemented as a demodulator circuit. The circuit 316 may be implemented as a local oscillator circuit (or reference clock). The circuit 318 may be implemented as a clock driver circuit. The circuit 302 may comprise other components (not shown). The implementation of the circuit 302 may be varied according to the design criteria of a particular implementation.

In various embodiments, the circuit 302 may be configured receive the broadcasted version of the synchronization signal SYNC. In the example shown, the antenna 300 may receive the carrier signal SYNC' generated by the source circuit 102$a$. The signal SYNC' may comprise the synchronization signal SYNC generated by the master clock module 106$a$. The carrier signal SYNC' may be presented to the low noise amplifier 312. The low noise amplifier 312 may amplify the signal SYNC' and/or particular frequencies of the carrier signal SYNC'. The demodulator circuit 314 may receive the signal SYNC'. The demodulator circuit 314 and/or the local oscillator circuit 316 may be configured to recover the synchronization signal SYNC from the carrier signal SYNC'. The synchronization signal SYNC may be presented by the circuit 302 via the clock driver circuit 318.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a first independently clocked device comprising a first clock generator, a first frequency synthesizer, and a transmitter circuit, wherein (i) said first clock generator is configured to generate a first clock signal, (ii) said first clock signal provides internal clocking for said first independently clocked device, (iii) said first frequency synthesizer is configured to generate a synchronization signal in response to said first clock signal, and (iv) said transmitter circuit is configured to wirelessly transmit a broadcast signal communicating only said synchronization signal; and
a plurality of second independently clocked devices, each second independently clocked device comprising a respective receiver circuit, a respective second frequency synthesizer, and a respective second clock generator, wherein (i) said respective receiver circuit is configured to receive said broadcast signal transmitted by said transmitter circuit and present a recovered synchronization signal to an input of said respective second clock generator, (ii) said respective second clock generator is configured to generate a respective intermediate clock signal and synchronize said respective intermediate clock signal with said recovered synchronization signal, and (iii) said second frequency synthesizer is configured to generate a respective second clock signal that provides internal clocking for said second independently clocked device, wherein said respective second clock signals of said second independently clocked devices are synchronized to said first clock signal of said first independently clocked device in response to said recovered synchronization signal.

2. The apparatus according to claim 1, wherein said synchronization signal comprises a frequency lower than said first clock signal.

3. The apparatus according to claim 1, wherein said synchronization signal has a frequency measured in kHz.

4. The apparatus according to claim 1, wherein said synchronization signal has a frequency measured in MHZ.

5. The apparatus according to claim 1, wherein said synchronization signal has a frequency measured in GHz.

6. The apparatus according to claim 1, wherein said synchronization signal is modulated on a carrier signal by said transmitter circuit.

7. The apparatus according to claim 1, wherein said first independently clocked device comprises a motherboard and said one or more second independently clocked devices comprise PCIe cards.

8. The apparatus according to claim 1, wherein said first independently clocked device and said one or more second independently clocked devices are components of a multi-chip module.

9. The apparatus according to claim 1, wherein said first independently clocked device and said one or more second independently clocked devices are components distributed around a vehicle.

10. The apparatus according to claim 1, wherein said first independently clocked device and said one or more second independently clocked devices comprise separate systems located within a broadcast range of said transmitter circuit.

11. A method of wirelessly synchronizing a clock network comprising:
generating a first clock signal using a first clock generator of a first independently clocked device;
generating a synchronization signal in response to said first clock signal using a first frequency synthesizer of said first independently clocked device;
wirelessly broadcasting a broadcast signal communicating only said synchronization signal;
receiving said broadcast signal and generating a recovered synchronization signal at each of a plurality of second independently clocked devices;
generating respective intermediate clock signals using respective second clock generators of each of said second independently clocked devices and synchronizing said respective intermediate clock signals with said recovered synchronization signal; and
generating respective second clock signals that provide internal clocking for said second independently clocked devices using respective second frequency synthesizers, wherein said respective second clock signals of said second independently clocked devices are synchronized to said first clock signal of said first independently clocked device in response to said recovered synchronization signal.

12. The method according to claim 11, wherein said synchronization signal comprises a frequency lower than said first clock signal.

13. The method according to claim 11, wherein said synchronization signal has a frequency measured in kHz.

14. The method according to claim 11, wherein said synchronization signal has a frequency measured in MHZ.

15. The method according to claim 11, wherein said synchronization signal has a frequency measured in GHz.

16. The method according to claim 11, wherein said synchronization signal is modulated on a carrier signal by a transmitter circuit.

17. The method according to claim 11, wherein said synchronization signal is broadcast as an infrared signal.

18. The method according to claim 11, wherein said synchronization signal comprises a predetermined bit sequence.

19. The method according to claim 11, wherein said synchronization signal is broadcast as an ultrasonic signal.

20. The method according to claim 11, wherein a timing generated by said second clock signals associated with said one or more second independently clocked devices is matched to said first clock signal in response to said synchronization signal.

* * * * *